(No Model.) 5 Sheets—Sheet 1.
G. F. WRIGHT.
WIRE NETTING MACHINE.
No. 490,009. Patented Jan. 17, 1893.
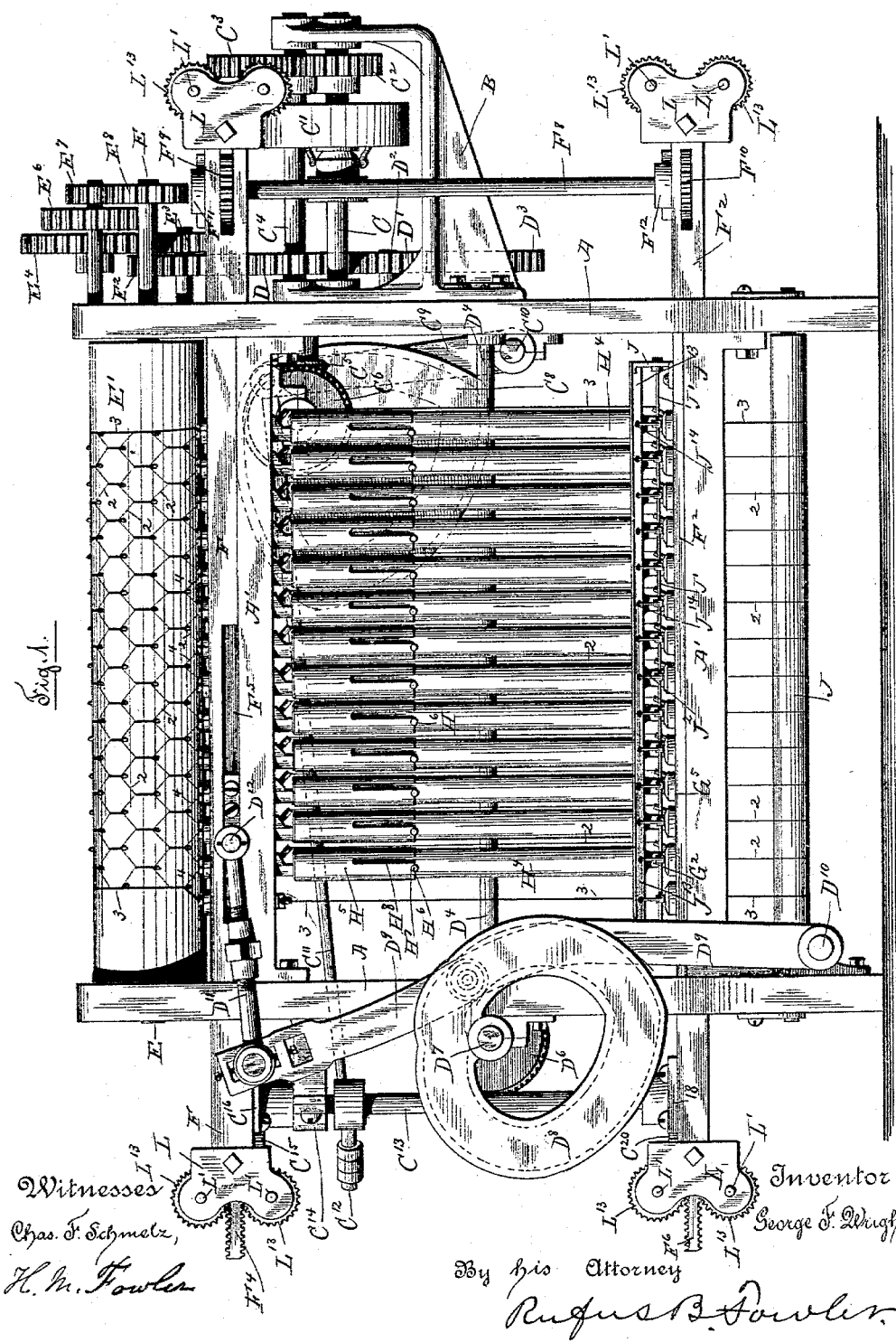
Witnesses
Chas. F. Schmelz,
H. M. Fowler
Inventor
George F. Wright
By his Attorney
Rufus B. Fowler (No Model.) 5 Sheets—Sheet 2.
G. F. WRIGHT.
WIRE NETTING MACHINE.
No. 490,009. Patented Jan. 17, 1893.
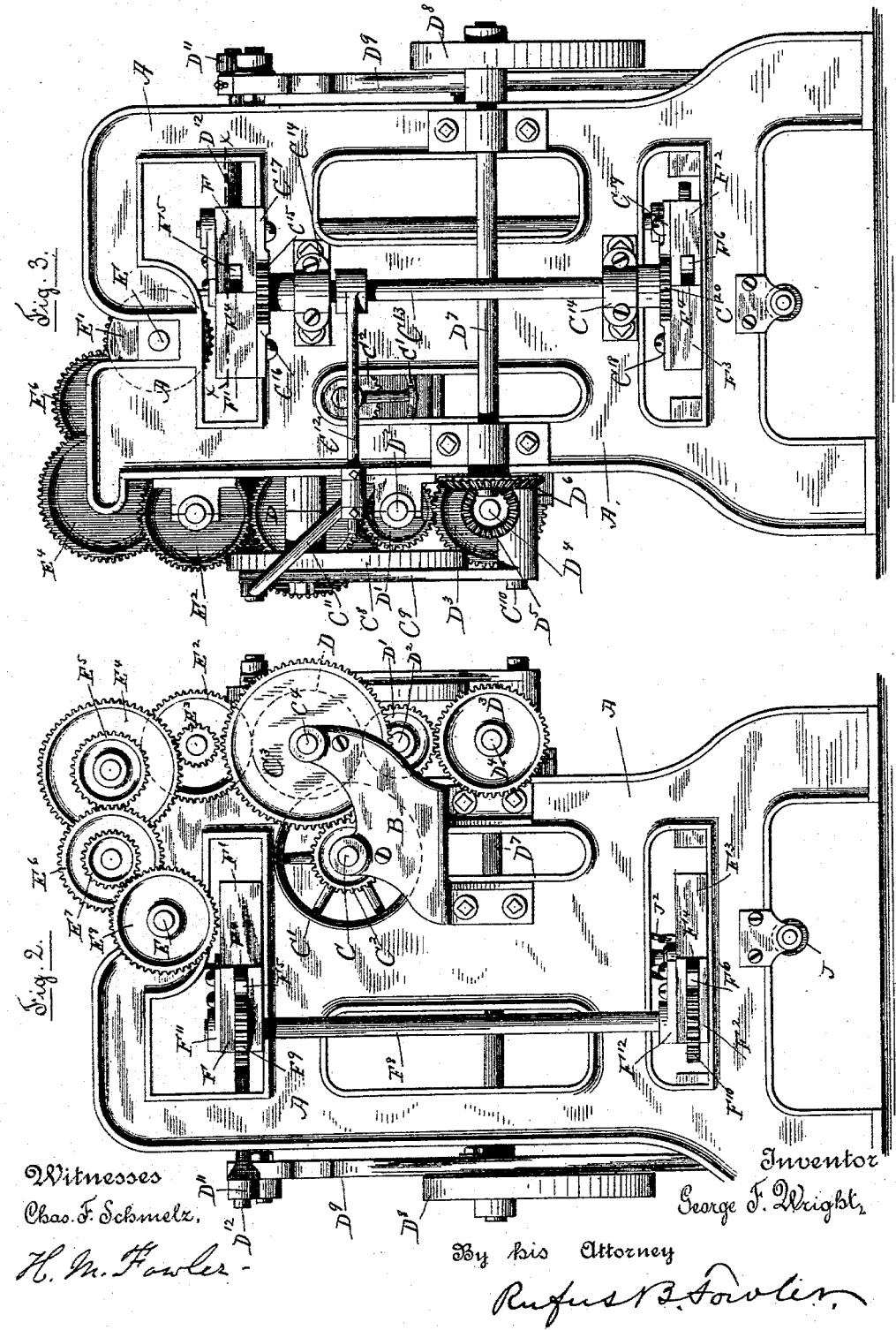
Witnesses
Chas. F. Schmelz.
H. M. Fowler.
Inventor
George F. Wright,
By his Attorney
Rufus B. Fowler.

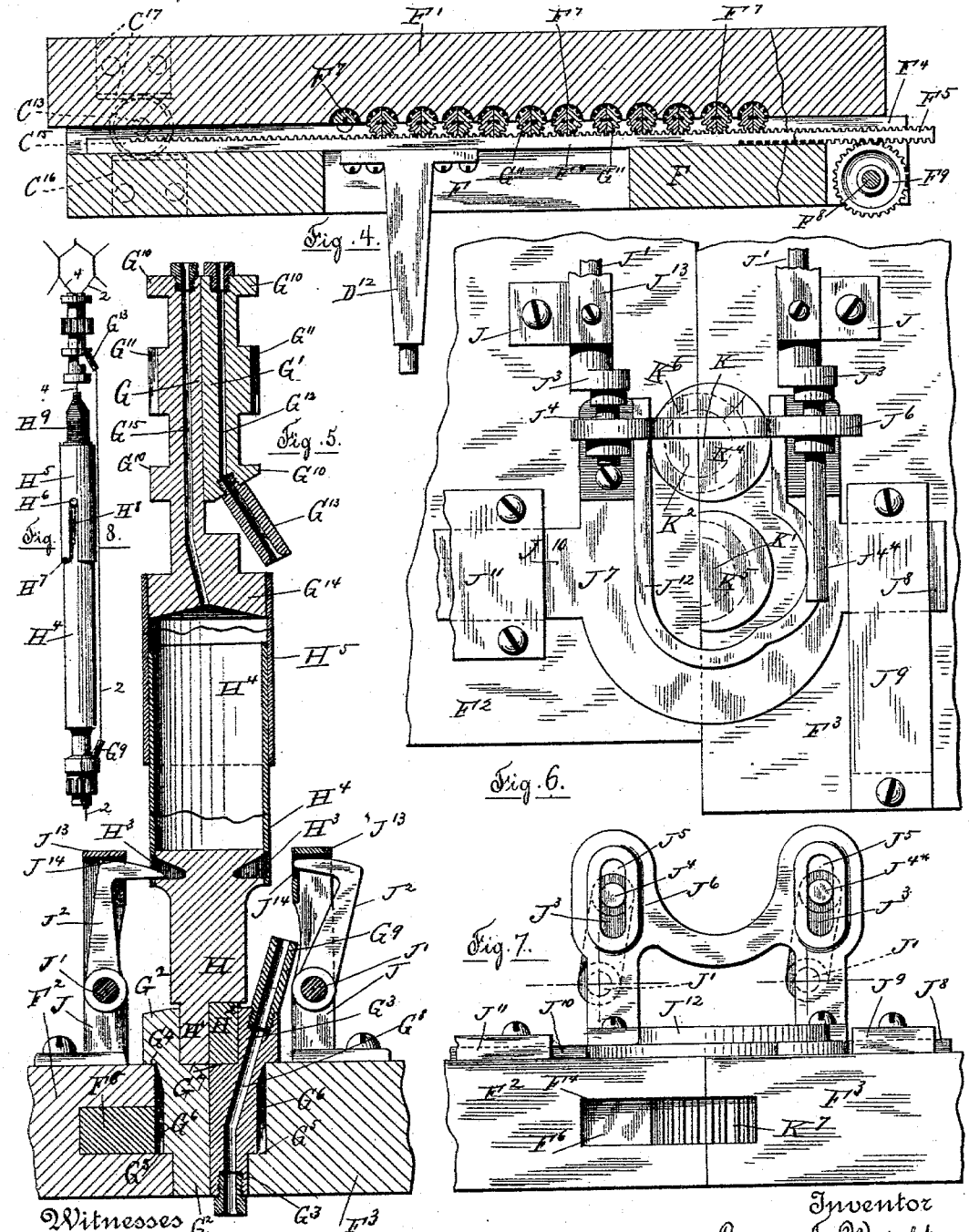

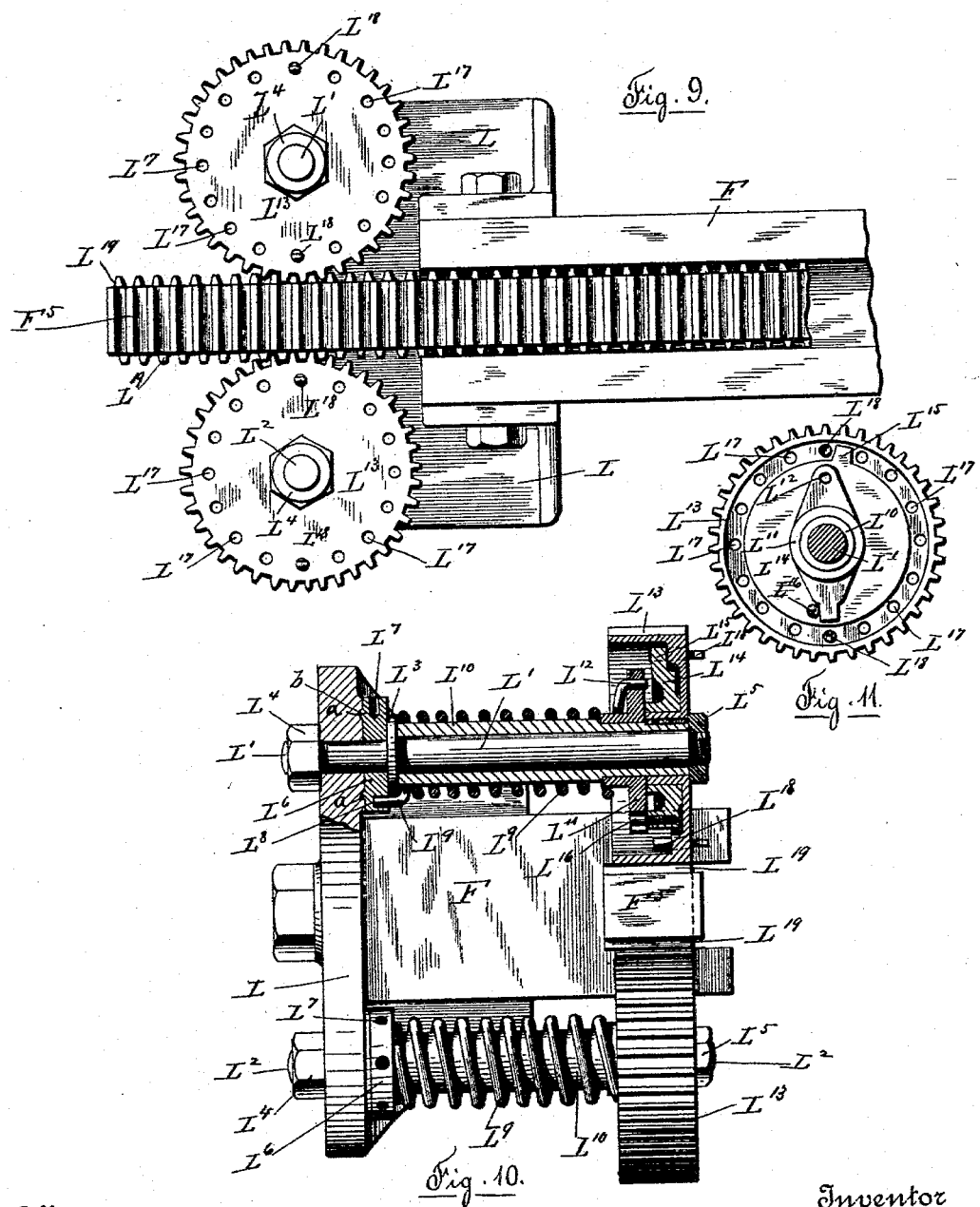

(No Model.)   5 Sheets—Sheet 5.

G. F. WRIGHT.
WIRE NETTING MACHINE.

No. 490,009.   Patented Jan. 17, 1893.

Witnesses
Chas. F. Schmelz.
H. M. Fowler.

Inventor
George F. Wright,
By his Attorney
Rufus B. Fowler.

UNITED STATES PATENT OFFICE.

GEORGE F. WRIGHT, OF PALMER, MASSACHUSETTS.

WIRE-NETTING MACHINE.

SPECIFICATION forming part of Letters Patent No. 490,009, dated January 17, 1893.

Application filed July 5, 1888. Serial No. 279,106. (No model.)

*To all whom it may concern:*

Be it known that I, GEORGE FLETCHER WRIGHT, a citizen of the United States, residing at Palmer, in the county of Hampden and State of Massachusetts, have invented certain new and useful Improvements in Wire-Netting Machines, of which the following is a specification, accompanied by drawings, in which—

Figure 12:
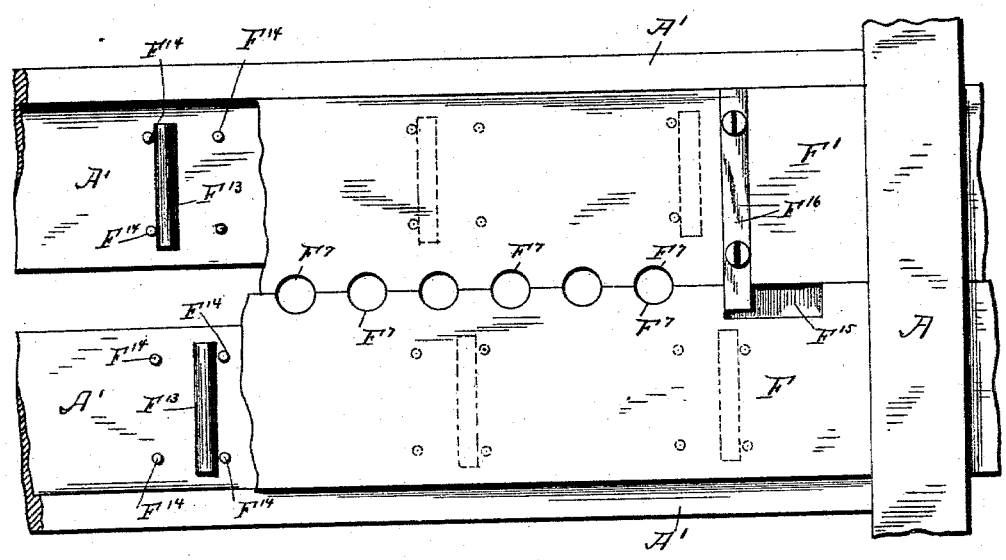
Figure 13:
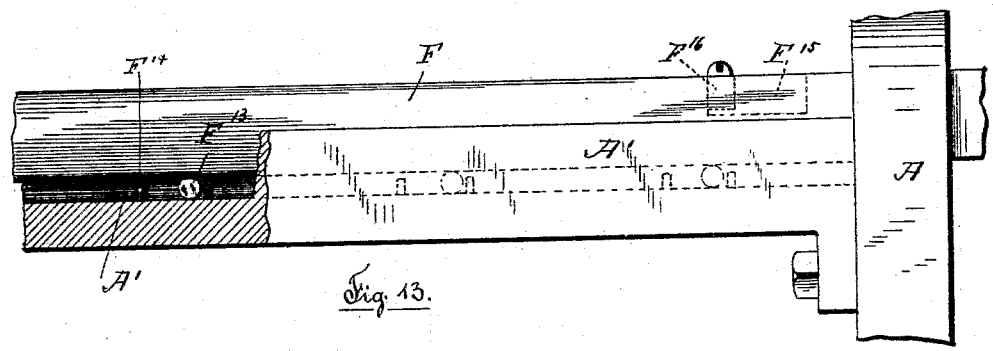

Figure 1 represents a front view of a wire netting machine, Figs. 2 and 3 show the right and left hand sides of the machine, Fig. 4 is a top and sectional view of the sliding bars, or carriages, the section being shown on line $x$—$x$ of Fig. 3, Fig. 5 is a vertical central sectional view of one of the twisting spindles, Fig. 6 is a top view of a part of the mechanism for actuating the latching hooks for holding the cop tubes from rotating, Fig. 7 is an end view of the same mechanism, Fig. 8 represents the cop tube with its cover moved down, Fig. 9 shows in elevation the mechanism for checking the momentum of the racks, Fig. 10 is an end view of the same, partly in sectional view, Fig. 11 shows one of the gears and a part of the connected mechanism, Fig. 12 represents a portion of the upper carriages, partly in section to disclose the friction rolls upon which they rest, and Fig. 13 is a side view of a part of the upper carriages, partly in sectional view.

Similar letters and figures refer to similar parts in the several views.

My invention relates to the construction and arrangement of the several parts of a machine for producing twisted wire netting as herein described and specifically set forth in the claims.

My improved wire netting machine belongs to that class of machines for making wire netting in twisting together the pairs of wires carried by the segments of rotating spindles, the wires of each pair being alternately interchanged so as to form meshes and the process of forming the meshes by means of wire carrying spindles in segments or half spindles is in general the same as in other machines of its class now in common use.

My invention has for its objects to reduce the strain upon certain parts of the operating mechanism, thereby enabling the machine to be operated at a higher speed; to lessen the momentum of the moving parts and to increase the efficiency of the machine and the quality of the manufactured product.

Referring to the accompanying drawings, A denotes the supporting frame; B a bracket attached to the frame; C the driving shaft carrying the belt pulley C' and pinion $C^2$, which engages the gear wheel $C^3$ upon the shaft $C^4$, journaled in bearings supported by the frame A and the bracket B and carrying a bevel gear $C^5$, which engages a bevel gear $C^6$ on a short shaft $C^7$ placed transversely to the machine and carrying a cam $C^8$ by which a vibratory motion is imparted to a lever $C^9$ pivoted at $C^{10}$ to the frame of the machine.

D denotes a gear wheel on the shaft $C^4$, engaging an intermediate gear D' upon a stud $D^2$ and through the intermediate gear D' and gear $D^3$ communicating rotary motion to a shaft $D^4$, which carries a bevel gear $D^5$ engaging a bevel gear $D^6$ upon the transverse shaft $D^7$, extending across the machine and having the cam $D^8$ by which a vibrating motion is imparted to the lever $D^9$ pivoted to the frame of the machine at $D^{10}$.

From the gear D a slow rotary motion is imparted to the shaft E and take up roll E' through the train of gears comprising the gear $E^2$ and attached pinion $E^3$, gear $E^4$ and attached pinion $E^5$, gear $E^6$ and attached pinion $E^7$ and gear $E^8$ on the shaft E, the intermediate train of gearing turning loosely upon studs held by the frame work of the machine.

Sliding in ways A', supported by the frame A, are the sliding bars, or carriages, F, F', forming what are called the upper carriages, and $F^2$, $F^3$, forming the lower carriages. The carriages F, $F^2$ are provided with longitudinal grooves $F^4$, which form the ways for the racks $F^5$ and $F^6$, having a sliding motion along the grooves $F^4$.

The inner edges of the sliding carriages F, F', $F^2$ and $F^3$, slide in contact and are provided with semi-circular notches $F^7$, which form the bearings for the rotating twisting spindles, those in the upper carriages composed of the half spindles G and G' and those in the lower carriages composed of half spindles $G^2$ and $G^3$, each of the half spindles having half gears in the same plane and engaged by the racks $F^5$, $F^6$, whereby the reciprocating motion of the racks is made to impart a rotary motion to the spindles.

The construction of the twisting spindles is clearly shown in the central sectional view in Fig. 5. The lower spindles composed of the half spindles $G^2$, $G^3$, rest upon the flanges $G^4$ and shoulders $G^5$ and are provided with the pinions $G^6$, which engage the rack $F^6$, and the sockets $G^7$ to receive the step H. The half spindle $G^3$ has a passage $G^8$ with its upper section coincident with the passage through the tube $G^9$, which is screwed into the upper end of the half spindle $G^3$. The step H has a semi-circular projection $H'$, which with a semi-circular block $H^2$ forms a journal around which the lower spindle rotates. The upper end of the step H has the notches $H^3$ on opposite sides to receive the latches which hold the step from rotating and it also has attached thereto the cop holding tube $H^4$. The upper spindle composed of the half spindles G, $G'$, have flanges $G^{10}$, resting upon the upper and lower sides of the upper carriages, and the pinions $G^{11}$, engaging the rack $F^5$. The half spindle $G'$ has a passage $G^{12}$, extending vertically through the half spindle and communicating with the passage through the oblique tube $G^{13}$, screwed into the half spindle $G'$ and in the same vertical plane as the lower oblique tube $G^9$. The half spindle G is extended downward below the upper carriages and terminates in the cylindrical head $G^{14}$, concentric with the upper and lower spindles and also with the cop holding tube $H^4$, with its diameter the same as the diameter of the cop holding tube $H^4$.

$H^5$ denotes a sliding telescopic cover for the cop holding tube, passing over the cylindrical head $G^{14}$ and held in place by a pin $H^6$ in the cop holding tube entering a notch $H^7$ in the lower end of the cover $H^5$. The cover $H^5$ is provided with a slot $H^8$ which permits the cover to be slipped down by turning the cover so the slot will be brought in line with the pin $H^6$.

In Fig. 1 the telescopic covers are shown in their highest position, held by the pins $H^6$ in the cop holding tubes and covering the inclosed cops of wire and in Fig. 8, the telescopic cover is shown in its lowest position still sustained by the pin $H^6$ entering the slot $H^8$ and disclosing the upper end of the cop $H^9$ held in the cop holding tube $H^4$. The half spindle G has a passage $G^{15}$ starting from the center of the head $G^{14}$ and extending a short distance in an oblique direction, thence vertically and parallel with the passage $G^{12}$ in the half spindle $G'$. The wires 2, 2, 2, and the twisted selvage wires 3, 3, are taken from spools or bobbins, not shown, over the roll J, Fig. 1, through the wire passages $G^8$ in the half spindles $G^3$, through the oblique tubes $G^9$ and $G^{13}$, and passages $G^{12}$, as shown in Fig. 8. The wire from the cops held in the several cop holding tubes are conducted through the passage $G^{15}$.

When the cop is inserted in the cop tube the cover $H^5$ is raised and partially rotated until the pin $H^6$ enters the notch $H^7$ holding the cover in position and also holding it from being rotated as the cylindrical head $G^{14}$ is rotated within the cover. The oblique tubes $G^9$, $G^{13}$ serve to carry the wires 2 outside the cop tubes so the wires 2 will be carried around the cop tubes $H^4$ in the operation of twisting while the cop tubes are held from turning by the latches as hereinafter described. The upper segmental spindles are rotated for the purpose of twisting the wires 2 and 4 together by the reciprocating motion of the rack $F^5$ in one direction actuated by the cam $D^8$, lever $D^9$ and connecting rod $D^{11}$ connecting the lever $D^9$ with the arm $D^{12}$ attached to the rack $F^5$. A simultaneous motion in the same direction is given to the rack $F^6$ by means of the vertical shaft $F^8$, having the gear wheels $F^9$, $F^{10}$ engaging the racks $F^5$, $F^6$ and journaled in the bearings $F^{11}$ attached to the carriage F and bearing $F^{12}$ attached to the carriage $F^2$. When the rack $F^5$ has completed its motion in one direction and effected the requisite number of rotations to the twisting spindles to impart the desired twist to the wires, the carriages are moved each in an opposite direction for a distance equal to one half the space between the twisting spindles, and as the contacting faces of the half spindles are left in the same plane and coincident with the contacting edges of the carriages by means of the movement of the actuating racks $F^5$, $F^6$, each of the half spindles will be moved into correspondence with the opposing half spindle of the next adjacent pair, in the same manner as is common in the wire netting machines now in use. The racks $F^5$, $F^6$ are then reciprocated in the opposite direction again causing the twisting spindles to be operated and the wires to be again twisted.

The reciprocating motion of the carriages is accomplished by means of the actuating cam $C^8$, vibrating lever $C^9$ pivoted at $C^{10}$, connecting rod $C^{11}$, connecting the lever $C^9$ with the radial arm $C^{12}$ on shaft $C^{13}$ journaled in bearings $C^{14}$ attached to the frame of the machine and carrying the gears $C^{15}$ engaging the racks $C^{16}$, $C^{17}$ attached to the under side of the carriages F, $F'$, and the gear $C^{20}$ engaging the racks $C^{18}$, $C^{19}$ attached to the upper side of the carriages $F^2$, $F^3$. The partial rotation of the vertical shaft $C^{13}$, as actuated by the cam $C^8$, will cause the carriages F, $F'$ and the carriages $F^2$, $F^3$ to be equally and simultaneously moved in opposite directions and the rack actuating cam $D^8$ is so shaped that as the carriages F and $F^2$ are being moved for the purpose of shifting the segmental spindles, the racks are moved with the carriages so that the racks are at rest relatively to the carriages which carry them and the twisting spindles are allowed to remain at rest while the carriages are moved and the segmental spindles are shifted. When the carriages have reached the limit of their movement and a new combination of segmental spindles has been effected, the rack is moved back causing the rotation of the twisting spindles, twisting the wires together as before. The carriages are moved along ways A' upon rolls $F^{13}$, which have a motion on the ways limited by the pins $F^{14}$, shown in Figs 12 and 13. The carriages F and $F^2$ are provided with rectangular notches $F^{15}$, one of which is shown in Fig. 12, and the carriages F', $F^3$ have bars $F^{16}$ attached extending into said notches in order to limit the reciprocating motion of the carriages and insure the coincidence of the segmental spindles in one of the carriages with those in the opposite carriage as the carriages are brought to a state of rest and the racks are moved in order to rotate the twisting spindles.

It will be observed from the described motions of the racks and carriages, that the carriage cam is of the proper shape to reciprocate the carriages, then to allow a period of rest while the racks are being moved then to reciprocate the carriages through a reverse movement, then to allow a second period of rest while the racks are being moved, thus completing an entire rotation of the carriage cam. The rack cam is so constructed as to move the racks a sufficient distance to give as many rotations to the twisting spindles as it is required to give complete twists to the wires during the period of rest of the carriages and during the motion of the carriages the racks are moved with the carriage containing them so as to allow the twisting spindles to remain at rest while the carriages are being moved.

Posts J are attached to the upper side of the carriages $F^2$, $F^3$, in which are journaled the oscillating shafts J', J', Figs. 1, 5 and 7 and to the oscillating shafts J' are attached the latches $J^2$, placed opposite the twisting spindles and in position to engage the notches $H^3$ in the steps H. The oscillating shafts J' have arms $J^3$, which carry pins $J^4$ entering the slots $J^5$ in the vertical plate $J^6$, which extends upward from a horizontal plate $J^7$, having the wing $J^8$ held beneath the strap $J^9$ attached to the carriage $F^3$, and the wing $J^{10}$ held beneath the strap $J^{11}$ attached to the carriage $F^2$. The horizontal plate $J^7$ has a vertical rib $J^{12}$ around its inner edge between the sides of which the carriage $F^3$ carries the half spindles indicated by the broken lines K, K' and the carriage $F^2$ carries the half spindle $K^2$, all being held in notches in the inner edges of the carriages in the same manner as the lower half or segmental spindles $G^2$, $G^3$ are held. Each of the half spindles K, K', $K^2$ is provided with half pinions forming gears when the spindles are made to coincide, one of such gears being shown at $K^7$ in Fig. 7. At the upper ends of the half spindles are eccentrics, the spindles K, K' having the half eccentrics $K^4$, $K^5$ and the half spindle $K^2$ having the half eccentric $K^6$, which is caused to form an entire eccentric alternately with the half eccentrics $K^4$, $K^5$, as the carriages $F^2$, $F^3$ are shifted and the eccentrics so completed are rotated by means of the rack $F^6$ in the same manner as the lower spindles $G^2$, $G^3$ are rotated. By the rotation of the eccentric formed of the half eccentrics as described, the horizontal plate resting upon the upper side of the carriages $F^2$, $F^3$ is moved transversely to the carriages, the wing $J^{10}$ sliding beneath the strap $J^{11}$ and as the carriages $F^2$, $F^3$ are moved longitudinally the wing $J^8$ slides beneath the strap $J^9$. As the plate $J^7$ is carried with the carriage $F^2$ in its longitudinal movement, the pin $J^{4*}$ is extended so it may slide in the slot $J^6$ without being withdrawn therefrom. The transverse movement of the plate $J^7$ as it is actuated by the eccentrics will impart a rocking motion to the shafts J', J', moving the attached latches $J^2$ alternately, first upon one side and then upon the opposite side, into the notches $H^3$ and holding the steps H and attached cop holding tubes from rotating as the upper and lower spindles are rotated by means of the racks $F^5$, $F^6$. This alternate engagement and disengagement of the latches is necessary in order to allow the wires 2, which passing through the oblique tubes $G^9$, $G^{13}$ are carried up outside the cop holding tubes $H^4$, and as the wider side of the eccentric is made to correspond with the half spindle having the oblique tubes $G^9$, $G^{13}$, the horizontal plate $J^7$ is moved transversely on the carriages $F^2$, $F^3$ so as to disengage the latches $J^2$ as the wires 2 are passing between the cop holding tubes $H^4$ and the latches as shown in Fig. 5 of the drawings, one of the latches upon the opposite sides of the steps H are therefore always within the notches $H^3$ in the step, preventing the rotation of the cop tubes.

As the meshes are formed by the twisting of the wires and the alternate shifting of the carriages in the manner described and as is substantially the method employed in the wire netting machines in use, the fabric is taken up by the roll E', which is provided with a series of pins which engage the meshes, carrying the fabric away from the twisting mechanism and usually delivering it to suitable mechanism by which it is wound into a roll, and which is not shown in the drawings as it forms no part of my present invention; a slow and continuous rotation being given the roll E' by means of the train of gears $C^2$ to E, inclusive.

The momentum of the racks $F^5$, $F^6$ is checked by means of the device shown in elevation in Fig. 1; in opposite elevation in Fig. 9 and in end and partially in sectional view in Fig. 10, in which L denotes a plate attached to the carriage F and carrying the studs L', $L^2$, provided with shoulders $L^3$ and screw threaded ends having nuts $L^4$, $L^5$. Between the shoulder $L^3$, Fig. 10 and the plate L is a washer $L^6$ having a series of radial holes $L^7$ and a hole $L^8$ to receive the end of a spiral spring $L^9$. Within the spiral spring $L^9$ and capable of turning upon the stud L' is a sleeve $L^{10}$ upon which the arm $L^{11}$ turns loosely Figs. 10—11, having a hole $L^{12}$ to receive the opposite end of the spiral spring $L^9$. Attached to the end of the sleeve $L^{10}$ is the gear $L^{13}$ held between the arm $L^{11}$ and the nut $L^5$ upon the end of the stud L', and turning loosely upon the hub of the gear $L^{13}$ is the disk $L^{14}$ having a radial spur or tooth $L^{15}$ and carrying a pin $L^{16}$, which is brought against the arm $L^{11}$ as the disk $L^{14}$ is rotated against the torsional resistance of the spiral spring $L^9$. The web of the gear $L^{13}$ is provided with a row of concentric holes $L^{17}$ in which pins $L^{18}$ are placed projecting within the gear to engage the radial spur $L^{15}$ upon the disk $L^{14}$. The upper and under sides of the racks $F^5$, $F^6$ are provided with teeth $L^{19}$ for a space from each end to engage the teeth of the gears $L^{13}$, so the reciprocating movement of the racks will impart an oscillating motion to the gears $L^{13}$, whose pins $L^{18}$ impart a rotary motion to the disks $L^{14}$, causing their pins $L^{16}$ to be brought against the arms $L^{11}$, as described. The pins $L^{18}$ are so placed in the gear $L^{13}$ so that, as the racks $F^5$, $F^6$ approach the end of their reciprocating motion in either direction, the torsional resistance of the spiral springs $L^9$ is applied to resist the momentum of the racks, and as the reverse movement of the racks begin the force of the spiral springs will then be applied in the line of the motion of the racks. By means of the intermediate disk $L^{14}$ between the gear and the arm $L^{11}$ nearly two whole rotations of the gear is permitted before the force of the spiral springs are applied to the racks, which may be reduced by the employment of more than one pin in the gear. The washers $L^6$ have a series of projections $a$ entering corresponding recesses $b$ in the plate L, which prevent the washer from turning as the spring is being wound up.

In case it is desired to vary the force of the springs, the nuts $L^4$ are loosened so as to release the washers which are turned upon the studs by means of a lever inserted in the radial holes $L^7$.

The mechanism carried upon one of the studs has only been shown in sectional view in the drawings, as that upon all the other studs are duplicates. The mechanism for checking the momentum of the rack $F^5$ is attached to each end of the carriage F and is the same upon each end except that its action is reversed so the springs upon one end serve to check the motion of the rack as it is moved toward that end, and the devices for checking the momentum of rack $F^6$ are the same and are attached to carriage $F^2$. Attached to the tips of the posts J are angle bars $J^{13}$, parallel with the shafts J', and provided with a series of openings $J^{14}$ through which the hooked ends of the latches $J^2$ pass as they are carried into the notches $H^3$ in the steps H, as the latches are removed from the notches $H^3$ the point of the hooks are withdrawn through the openings $J^{14}$ so the wires 2 are prevented from striking the ends of the latches as the wires are carried between the latches and the cop holding tubes $H^4$. The bars $J^{13}$ also serve to hold the hooked ends of the latches against any strain imparted by the tendency of the steps H to rotate as the wires are twisted.

What I claim as my invention and desire to secure by Letters Patent is:

1. In a wire netting machine, the combination with the wire twisting spindles, substantially as described, for twisting the wires forming the mesh, of a stationary step concentric with said twisting spindles and a cop holding tube for holding a cop of wire, said tube being attached to said stationary step, substantially as described.

2. In a wire netting machine, the combination, with the upper and lower wire twisting spindles composed of segmental spindles having semi-gears by which the spindles are rotated, of a step concentric with said spindles and resting in a bearing in the lower twisting spindle and held from turning by locking mechanism, substantially as described, a cop holding tube attached to said stationary step, and a sliding telescopic cover, substantially as described.

3. In a wire netting machine, the combination with the twisting spindles for twisting the wires, of a cop-holding tube for holding the cop of wire, said tube being open at the top end, and a sliding cover sliding upon the body of said cop-holding tube, substantially as described.

4. In a wire netting machine, the combination of twisting spindles for twisting the wires, a stationary step, a cop holding tube attached to said step and open at its upper end to receive the cop, and a sliding telescopic tube, sliding over the open end of the cop holding tube, and concentric with said twisting spindles, substantially as described.

5. In a wire netting machine, the combination with twisting spindles for twisting the wires, of a cop holding tube for holding the cop of wire and provided with a projecting pin, and a sliding telescopic cover provided with a slot inclosing said pin as the cover is moved upon the cop holding tube and a notch in which the pin enters to sustain the cover when the cop holding tube is closed, substantially as described.

6. In a wire netting machine, the combination with twisting spindles for twisting the wires, of a stationary step concentric with said twisting spindles, a cop holding tube attached to said step, a semi-cylindrical projection on said step and entering a step bearing in one of said spindles, and a semi-cylindrical block fitting said semi-cylindrical projection and filling the step bearing, substantially as described.

7. In a wire netting machine, the combination with twisting spindles for twisting the wires, of a stationary step provided with notches, a cop-holding tube attached to said step, and vibrating latches which engage the notches in said step and hold the same from rotating, substantially as described.

8. In a wire netting machine, the combination with a cop-holding tube for holding a cop of wire, of a supporting step attached to said cop-holding tube and provided with notches upon opposite sides, and vibrating latches on opposite sides of said step, having connected operating mechanism by which said latches are alternately engaged and disengaged from said notches, substantially as described.

9. In a wire netting machine, the combination with a cop-holding tube attached to a supporting step, a supporting step provided with notches, vibrating latches engaging said notches alternately, twisting spindles for twisting the wires, composed of half spindles having semi-gears, reciprocating carriages provided with semi-circular bearings in which said half spindles are journaled, and sliding racks sliding in longitudinal ways in said carriages and engaging said semi-gears, substantially as described.

10. In a wire netting machine, the combination of a cop holding tube, a stationary supporting step supporting said tube, twisting spindles concentric with said cop holding tube, a sliding telescopic cover sliding over the end of said cop tube, reciprocating carriages having journal bearings for said twisting spindles, and racks having a reciprocating motion and engaging gears upon said twisting spindles, substantially as described.

11. In a wire netting machine, the combination with twisting spindles for twisting the wires provided with passages for the wire, and a cop holding tube placed concentrically with said twisting spindles, of oblique tubes attached to said spindles and communicating with the wire passages therein, whereby the wire is held from contact with the cop holding tube, substantially as described.

12. In a wire netting machine, the combination with the lower spindle composed of the half spindles $G^2$, $G^3$ and the upper spindles composed of the half spindles G, G', and a cop tube placed concentrically with said spindles, of the oblique tubes $G^9$, $G^{13}$ by which one of the wires is held from contact with the outside of the cop holding tube, substantially as described.

13. In a wire netting machine, the combination with a cop holding tube for holding the cop of wire, and a supporting step supporting said cop holding tube and provided with notches to receive the retaining latches, of the parallel shafts J', hooked latches attached to said shafts, and connected operating mechanism by which said shafts are alternately rocked, substantially as described, whereby all the latches upon one side are engaged or disengaged with the notches in said steps, substantially as described.

14. In a wire netting machine, the combination with the cop tube, supporting steps having notches to receive the retaining latches, and vibrating retaining latches, substantially as described, of the shield plates $J^{13}$, having openings $J^{14}$, as and for the purpose set forth.

15. In a wire netting machine, the combination with the twisting spindles for twisting the wires and reciprocating carriages carrying said spindles, of the cop-holding tubes held concentrically with said spindles, supporting steps supporting said cop-holding tubes and provided with notches, posts J attached to the reciprocating carriages, shafts J' journaled in said posts, latches $J^2$ attached to said shafts whereby said latches are moved by the reciprocating motion of said carriages to correspond with said supporting steps, substantially as described.

16. In a wire netting machine, the combination with the twisting spindles for twisting the wires and cop-holding tubes held concentrically with said spindles, of supporting steps supporting said cop-holding tubes and provided with notches, rocking shafts J' having radial arms $J^3$, pins $J^4$, $J^{4*}$ entering slots $J^5$, sliding plate $J^7$ having the upright section $J^6$ provided with slots $J^5$, reciprocating carriages carrying the twisting spindles, actuating eccentrics carried in said reciprocating carriages by which a transverse sliding motion is imparted to the plate $J^7$, giving a rocking motion to the shafts J' and vibrating the latches $J^2$, substantially as described.

17. In a wire netting machine, the combination with the cop-holding tubes and their supporting steps, of the carriage $F^2$, carriage $F^3$, shaft J' supported in posts J attached to said carriage, said shafts having radial arms $J^3$ and pins $J^4$, $J^{4*}$, of the yoke plate $J^7$ having an upright section $J^6$ provided with slots $J^5$ inclosing the pins $J^4$, $J^{4*}$, the half eccentrics $K^4$, $K^5$, $K^6$, carried in said carriages and straps $J^9$ and $J^{11}$, by which the yoke plate $J^7$ is held upon said carriages and permitted a transverse motion upon the carriage $F^2$ and a longitudinal movement upon the carriage $F^3$, substantially as described.

18. In a wire netting machine the cop tube supporting steps H, having notches $H^3$, shafts J', attached latches $J^2$, radial arms $J^3$, pins $J^4$, $J^{4*}$, carriages $F^2$, $F^3$, sliding rack $F^6$, yoke $J^7$ having upright section $J^6$ provided with slots $J^5$, eccentrics composed of the half eccentrics $K^4$, $K^5$, $K^6$, provided with semi-gears arranged to be engaged at the proper time by the rack $F^6$, causing the rotation of the eccentric, transverse sliding motion of the yoke $J^7$ and rocking of the shafts J' combined, substantially as described.

19. In a wire netting machine, the carriages F, F' sliding in ways and having bearings for a series of twisting spindles, of the twisting spindles composed of the half spindles G, provided with a wire passage $G^{15}$ and a concentric head $G^{14}$, and G', provided with wire passage $G^{12}$ and oblique tube $G^{13}$, cop holding tube $H^4$, and sliding telescopic cover $H^5$ sliding over the end of the cop-holding tube and fitting the head $G^{14}$, substantially as described.

20. In a wire netting machine, the combination with the stationary steps H supporting the cop-holding tubes and provided with notches $H^3$, of the rocking shafts $J'$ journaled in posts J attached to the carriages $F^2$, $F^3$, carriages $F^2$, $F^3$ provided with bearings for the lower spindles, lower spindles composed of the half spindles $G^2$, $G^3$ supporting the steps H, radial arms $J^3$ and pins $J^4$, $J^{4*}$ attached to the shafts $J'$, and a slotted plate sliding transversely across the carriages and engaging the pins $J^4$, $J^{4*}$ so as to rock the shafts $J'$ and latches $J^2$ attached to said rocking shafts, substantially as described.

21. In a wire netting machine, the combination of a cop-holding tube held from rotation and placed concentrically with the twisting spindles, a sliding telescopic cover sliding on said tube, an upper twisting spindle provided with a head rotating within said sliding cover, and a lower twisting spindle rotating concentrically to said cop-holding tube, substantially as described.

22. In a wire netting machine, the combination with a series of wire twisting spindles provided with pinions, of an actuating rack provided with a laterally projecting arm, vibrating lever pivoted upon the rigid portion of the machine, connecting rod connecting the vibrating lever with said laterally projecting arm, and an actuating cam by which the actuating rack is reciprocated to rotate the twisting spindles, while the wires are being twisted and by which the rack is held from rotating the spindles while the wires are being shifted, substantially as described.

23. In a wire netting machine, the carriages F, $F'$, $F^2$, $F^3$ arranged in pairs, carrying wire twisting spindles and having a reciprocating movement along ways combined with an actuating shaft journaled in bearings attached to the rigid portion of the machine, said shaft having an oscillating motion at regular intervals, gears carried upon said shaft engaging racks on said carriages, and racks attached to said reciprocating carriages, whereby a similar and simultaneous movement is imparted to both pairs of reciprocating carriages, substantially as described.

24. In a wire netting machine, the combination with two pairs of reciprocating carriages carrying the wire twisting spindles, of racks attached to said carriages, a shaft journaled in fixed bearings, gears upon said shaft engaging the racks upon said carriages, a radial arm attached to said shaft, and an actuating cam by which through connecting mechanism an intermittent oscillating motion is imparted to said shaft, substantially as described.

25. In a wire netting machine, the combination with two pairs of reciprocating carriages, carrying the wire twisting spindles and having racks attached thereto, of the shaft $C^{13}$, gears $C^{15}$ and $C^{20}$, radial arm $C^{12}$, connecting rod $C^{11}$, vibrating lever $C^9$, and actuating cam $C^8$, as and for the purpose set forth.

26. In a wire netting machine, the combination with the ways for supporting the reciprocating carriages, and reciprocating carriages sliding along said ways and carrying the twisting spindles, of the rolls $F^{13}$ and stop pins $F^{14}$ by which the motion of said rolls is limited, substantially as described.

27. In a wire netting machine, the reciprocating carriage F, having a notch $F^{15}$, combined with the carriage $F'$ and bar $F^{16}$ entering said notch, whereby the motion of both carriages is limited, substantially as described.

28. The carriages F, $F'$ carrying wire twisting spindles and a rack $F^5$ with actuating cam, vibrating lever and connecting rod to move said rack, take up roll $E'$ and train of gearing to rotate the same, comprising the gears from $C^2$ to $E^3$, inclusive and driving shaft C, all combined and operating substantially as and for the purpose set forth.

29. The driving shaft C, shaft $D^4$, intermediate gearing comprising the gears $C^2$ to $D^3$, inclusive, bevel gears $D^5$, $D^6$, shaft $D^7$, cam $D^8$, lever $D^9$, connecting rod $D^{11}$, and rack $F^5$, combined with a series of wire twisting spindles, substantially as described.

30. In a wire netting machine, the combination with a series of wire twisting spindles, and a rack having an intermittent reciprocating motion whereby the twisting spindles are actuated and said rack being provided with teeth upon its upper and lower sides, of gears engaged by the upper and lower teeth of said rack and held in a fixed position during the reciprocating motion of said rack, but rotating loosely upon studs, and springs with one end held rigidly and the other end rotated by the rotation of said gears, whereby the torsional resistance of said springs is made to resist the momentum of said racks, substantially as described.

31. In a wire netting machine, the combination of a series of wire twisting spindles, an actuating rack having a reciprocating motion, a gear engaging said rack and a spiral spring with its torsional resistance applied to resist the rotation of said gear as effected by the reciprocating motion of said rack, whereby the momentum of said rack is checked at the end of its motion, substantially as described.

32. In a wire netting machine, the combination with a series of wire twisting spindles, a reciprocating rack by which they are actuated, a stud supporting frame attached to said rack, a stud held in said frame, a gear turning loosely around said stud and engaging said rack, and a spiral spring having one end rigidly held and the other end so applied to said gear that the torsional resistance of the spring will act to check the momentum of the acuating rack, substantially as described.

33. In a wire netting machine, the combination with a carriage F and rack $F^5$, of plate L, stud L', washer L⁷ held from turning upon said stud, spring L⁹ having one end held in said washer, and a gear engaging said rack, and intermediate connecting mechanism between said gear and said spring, substantially as described. whereby the spring is wound so its torsional resistance shall check the momentum of the rack, substantially as described.

34. In a wire netting machine, the combination with carriage F and rack F⁵ of plate L attached to said rack, stud L' held by said plate, spring L⁹ with one end rigidly held and the opposite end held in a plate L¹¹, plate L¹¹ turning loosely about said stud, disk L¹⁴ provided with a spur L¹⁵ and pin L¹⁶, and gear L¹³ engaging said rack and provided with holes L¹⁷ and pins L¹⁸, substantially as described.

GEORGE F. WRIGHT.

Witnesses:
RUFUS B. FOWLER,
H. M. FOWLER.